United States Patent [19]

Earnest

[11] Patent Number: 5,253,772
[45] Date of Patent: Oct. 19, 1993

[54] TAMPER EVIDENT CONTAINER ASSEMBLY

[75] Inventor: Edward M. Earnest, Owings Mills, Md.

[73] Assignee: Sweetheart Cup Company, Inc., Chicago, Ill.

[21] Appl. No.: 26,202

[22] Filed: Feb. 26, 1993

Related U.S. Application Data

[63] Continuation of Ser. No. 876,907, Apr. 30, 1992, abandoned, which is a continuation of Ser. No. 703,858, May 21, 1991, abandoned.

[51] Int. Cl.$^5$ ............................................. B65D 17/40
[52] U.S. Cl. .................................... 220/276; 220/270; 229/123.2; 53/488
[58] Field of Search ................ 220/276, 270; 215/256, 215/305; 229/123.2, 201; 156/69; 53/488, 471, 412

[56] References Cited

U.S. PATENT DOCUMENTS

| | | |
|---|---|---|
| 1,436,457 | 11/1922 | Moore . |
| 1,557,653 | 10/1925 | Carvalho .......................... 215/256 X |
| 1,955,865 | 4/1934 | Wellman . |
| 1,961,535 | 6/1934 | Taylor . |
| 2,002,564 | 5/1935 | Bergman ........................... 229/201 X |
| 2,041,537 | 5/1936 | Frost ................................... 229/45 |
| 2,073,537 | 3/1937 | Bombard ........................ 229/123.2 X |
| 2,383,760 | 8/1945 | Barbieri . |
| 2,493,086 | 1/1950 | Reifsnyder . |
| 2,800,266 | 7/1957 | Kelly . |
| 2,941,660 | 6/1960 | Tupper . |
| 3,044,610 | 7/1962 | Tupper . |
| 3,058,578 | 10/1962 | Struble . |
| 3,115,292 | 12/1963 | Repking . |
| 3,122,990 | 3/1964 | Fried . |
| 3,142,433 | 7/1964 | Balocca . |
| 3,155,233 | 11/1964 | Tupper ................................. 206/46 |
| 3,163,973 | 1/1965 | St. Clair ............................... 53/329 |
| 3,189,214 | 6/1965 | Henchert . |
| 3,197,107 | 7/1965 | Saunders . |
| 3,208,626 | 9/1965 | Miller et al. ........................ 220/270 |
| 3,317,068 | 5/1967 | Betner ........................... 229/123.2 X |
| 3,330,436 | 7/1967 | Slomski . |
| 3,344,912 | 10/1967 | Sternau ................................ 206/46 |
| 3,347,407 | 10/1967 | Coolidge, Jr. et al. ............... 220/54 |
| 3,348,358 | 10/1967 | Sternau ............................ 53/488 X |
| 3,402,874 | 9/1968 | Sternau ................................ 229/43 |
| 3,414,183 | 12/1968 | Wilcox ................................. 229/43 |
| 3,416,697 | 12/1968 | Ledzion ............................. 220/270 |
| 3,465,910 | 9/1969 | Richie . |
| 3,469,727 | 9/1969 | Acton ............................ 215/256 X |
| 3,557,998 | 1/1971 | Collie . |

(List continued on next page.)

FOREIGN PATENT DOCUMENTS

| | | |
|---|---|---|
| 699684 | 12/1964 | Canada ................................ 206/11 |
| 0098576 | 1/1984 | European Pat. Off. . |
| 0261645 | 3/1988 | European Pat. Off. . |
| 846072 | 9/1939 | France . |
| 876671 | 11/1942 | France . |
| 96848 | 9/1939 | Sweden . |
| 368532 | 3/1932 | United Kingdom . |
| 1172168 | 11/1969 | United Kingdom ................ 318/220 |

Primary Examiner—Gary E. Elkins
Assistant Examiner—Paul A. Schwarz
Attorney, Agent, or Firm—Nixon & Vanderhye

[57] ABSTRACT

A tamper evident container assembly includes an open-ended container body having a bottom wall and peripheral side wall, the side wall having an upper rim protruding radially outwardly of the peripheral side wall. A reusable lid has a top wall and a portion of which is tucked under the upper rim to thereby lock the lid to the container body. The depending skirt is further provided in a lower portion thereof with an annular line of weakening extending about the skirt portion to thereby define an annular tear strip inclusive of the free end so that upon removal of the tear strip, the lid may be removed from said container. A related method of assembling a tamper evident container assembly the steps of:
 a) filling the container body with contents;
 b) applying the lid to the container body; and
 c) tucking a substantial portion of the lower free edge under the rim to thereby provide a tamper evident container.

8 Claims, 1 Drawing Sheet

U.S. PATENT DOCUMENTS

| | | | |
|---|---|---|---|
| 3,572,579 | 3/1971 | Mueller. | |
| 3,589,551 | 6/1971 | Haggbom. | |
| 3,597,896 | 8/1971 | Koll et al. | 53/488 |
| 3,653,529 | 4/1972 | Segmuller. | |
| 3,673,761 | 7/1972 | Leitz | 53/42 |
| 3,773,207 | 11/1973 | Dokoupil et al.. | |
| 3,805,993 | 4/1974 | Enzie et al.. | |
| 3,812,993 | 5/1974 | Yoshioka et al. | 215/256 |
| 3,831,798 | 8/1974 | Rowe et al. | 215/256 |
| 3,865,268 | 2/1975 | Coop | 215/253 |
| 3,930,593 | 1/1976 | Ragettli | 220/276 |
| 3,979,003 | 9/1976 | Allen | 215/256 |
| 3,997,056 | 12/1976 | Mueller. | |
| 4,024,976 | 5/1977 | Acton | 215/32 |
| 4,032,029 | 6/1977 | Cochrane | 215/256 |
| 4,103,803 | 8/1978 | Irvine | 220/270 |
| 4,105,133 | 8/1978 | LaBarge et al. | 220/266 |
| 4,141,463 | 2/1979 | Smith | 220/359 |
| 4,208,954 | 6/1980 | Chase. | |
| 4,222,974 | 9/1980 | Smith | 156/272 |
| 4,228,909 | 10/1980 | Lecinski, Jr. | 215/253 |
| 4,238,047 | 12/1980 | Helms et al. | 220/306 |
| 4,305,517 | 12/1981 | Dennis | 215/256 |
| 4,394,918 | 7/1983 | Grussen | 215/243 |
| 4,442,971 | 4/1984 | Helms | 229/43 |
| 4,458,821 | 7/1984 | Ostrowsky | 215/252 |
| 4,458,822 | 7/1984 | Ostrowsky | 215/252 |
| 4,470,513 | 9/1984 | Ostrowsky | 215/252 |
| 4,476,993 | 10/1984 | Krout | 220/276 |
| 4,478,343 | 10/1984 | Ostrowsky | 215/252 |
| 4,487,329 | 12/1984 | Winstead | 220/276 |
| 4,493,432 | 1/1985 | Smith | 220/276 X |
| 4,531,669 | 7/1985 | Osborne. | |
| 4,602,718 | 7/1986 | Dutt. | |
| 4,607,759 | 8/1986 | Boetzkes | 220/266 |
| 4,682,706 | 7/1987 | DeVore et al. | 220/276 |
| 4,782,968 | 11/1988 | Hayes | 215/276 |
| 4,798,301 | 1/1989 | Bullock et al. | 215/256 |
| 4,803,829 | 2/1989 | Scheidegger | 53/488 X |
| 4,881,656 | 11/1989 | Chumley et al. | 220/270 |
| 4,966,294 | 10/1990 | Mack et al.. | |
| 5,002,198 | 3/1991 | Smith | 220/276 |

TAMPER EVIDENT CONTAINER ASSEMBLY

This is a continuation of application Ser. No. 07/876,907, filed Apr. 30, 1992, now abandoned, which is a continuation of application Ser. No. 07/703,858, filed May 21, 1991, now abandoned.

BACKGROUND AND SUMMARY OF THE INVENTION

This invention relates to tamper proof (or "tamper evident") container assemblies, and more specifically, to a container and lid assembly in which the lid is effectively locked to the container body prior to initial use by means of a removable tear strip integrally formed with the lid, and which nevertheless permits repeated reapplication and removal of the lid to the container body. At the same time, any tampering with the cover to gain access to the interior of the container will be immediately apparent.

Numerous attempts have been made in the container industry and specifically with respect to consumer oriented foodstuffs, medicines, etc. to prevent potentially harmful tampering with the contents of such containers. It is well known, for example, to heat seal a thin foil disk about the container opening prior to assembly of the lid. This approach, while successful to a large extent, nevertheless involves the addition of another component to the assembly, i.e., the foil disk, and related assembly procedures and associated costs.

Other attempts to provide effective tamper proof mechanisms in container assemblies are well documented in the patent literature. U.S. Pat. No. 4,966,294, for example, discloses a tamper evident closure for a wide mouth container wherein rim segments are formed in the skirt portion of the container lid and are arranged so that upward lifting force applied against the lid flange will cause breakage to occur at opposite ends of the flange, and a continued upward pulling on the flange will result in a pair of tear lines in the lid to facilitate removal of the lid.

In U.S. Pat. No. 2,383,760, a closure for a container includes a flat upper surface in the peripheral depending skirt portion around which is adhesively secured a strip which extends below the container flange and includes a bent marginal flange portion extending upwardly and inwardly from the bend. The flange is a continuous, smooth flange which, after insertion over the upper portion of the container, will snap into locking engagement with the flange. The marginal portion of the sealing strip is provided with a strip of adhesive so that the marginal portion will be cemented to the inside face of the container flange. No means are provided, however, for facilitating the easy removal of the closure. In fact, it is stated that when a container is opened, the cover will be disposed of, apparently because it will be damaged or destroyed in the opening operation.

In U.S. Pat. No. 1,955,865, container closures are disclosed which are formed with depending skirt portions and integral circumferentially spaced bent tab portions. These tab portions are designed to cooperate with complementary circumferentially spaced tabs formed on the periphery of the container side wall. Locking of the lid to the container is achieved by pressing the closure down over the tabs and rotating it so that the tabs will lie behind respective tabs on the container side wall. Fairly rigid disks are required to maintain the locking engagement between the cover and the container.

Other tamper proof constructions are disclosed in U.S. Pat. Nos. 3,044,610; 3,997,056 and 4,602,718.

These prior efforts are characterized by rather complex, and therefore costly, arrangements which are not fully satisfactory in all respects.

It is the principle object of the present invention to provide a simple, low cost yet effective tamper proof or tamper evident container assembly which permits repeated application and removal of the container lid even after one time use of the tamper evident mechanism by the consumer upon initial opening.

In an exemplary embodiment of the invention, there is provided a container and lid assembly including an open ended container body having a bottom wall and a peripheral side wall. The upper end of the peripheral side wall is provided with a radially outwardly extending flange, preferably formed by outward rolling and subsequent compression of the upper free edge of the peripheral side wall in a manner well known to those skilled in the art.

The container lid is formed with a top wall and an annular depending skirt which is formed with an annular line of weakening extending about the entire skirt at a location intermediate upper and lower ends of the skirt, and preferably toward the lower end.

After the container has been filled, the lid is applied and the free end of the skirt is mechanically tucked under the lower edge of the rim or seam at the upper end of the container body by a conventional curling iron. This mechanical curling or tucking operation causes the lower free end of the skirt to be bent around the lower end of the container rim to thereby lock the lid to the container body. In a preferred arrangement, a small portion of the lower edge of the skirt is left untucked to thereby provide a gripping area to permit the user to tear away the lower end portion of the skirt by reason of the annular line of weakening. Once this "tear strip" has been removed, the lid may be simply and easily lifted from the container body. Because of the relative length of the skirt left intact after removal of the tear strip portion, the lid may be effectively and repeatedly used by the consumer. At the same time, since the tear strip must be at least partially removed or otherwise deformed to allow separation of the lid from the container, any tampering with the container prior to its initial use will be immediately apparent from visual inspection.

Accordingly, the present invention provides a significant improvement over prior art tamper proof containers, and particularly those which result in the effective destruction of the lid during the initial opening of a container.

The tamper proof assembly of this invention thus provides the following advantages: 1) the tamper proof mechanism is integrally incorporated into the lid; 2) the previously required foil disk is eliminated; 3) a reclosing feature for the lid is retained; and 4) the assembly of this invention can be utilized by, for example, food stuffs distributors, with only minor modifications and/or additions to existing equipment.

In its broader aspects, therefore, the invention relates to tamper proof container assembly comprising an open-ended container body having a bottom wall and peripheral side wall, the side wall having an upper rim protruding radially outwardly of the peripheral side wall; a reusable lid having a top wall and a depending skirt, the skirt having a free end, a major portion of which is tucked under the upper rim to thereby lock the lid to the container body; and wherein the depending skirt is further provided in a lower portion thereof with a line of weakening extending annularly about the skirt portion to thereby define an annular tear strip inclusive of the free end so that upon removal of the tear strip, the lid may be removed from the container.

In another aspect, the invention relates to a tamper proof container assembly comprising an open-ended container body having a bottom wall and a peripheral side wall having a rim flange at an upper edge thereof; a reusable lid having a top wall and a depending skirt, the depending skirt incorporating first means for locking the lid to the container body, and second means for facilitating removal of the first means so as to allow removal of the lid from the container body without destroying the lid.

In a related aspect, the invention concerns a process for assembling a tamper proof container assembly including a container body having a bottom wall and a peripheral side wall including a radially outwardly projecting rim at an upper end thereof, and a reusable lid having a top wall and a depending skirt, the depending skirt having a line of weakening formed therein extending annularly around the skirt intermediate an upper end and a lower free edge thereof to thereby define a removable tear strip; the method comprising the steps of:

a) filling the container body with contents;
b) applying the lid to the container body; and
c) tucking a substantial portion of the lower free edge under the rim.

Additional objects and advantages of the invention will become apparent from the detailed description which follows.

DETAILED DESCRIPTION OF THE DRAWINGS

Figure 1:
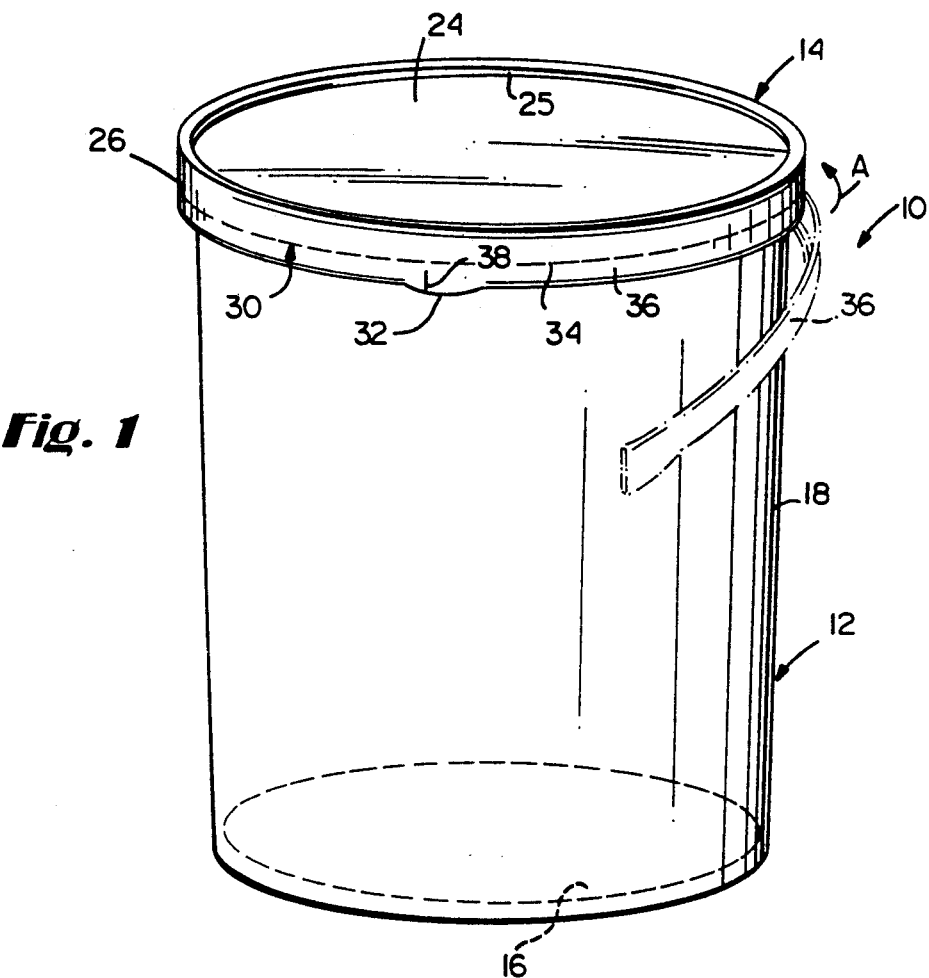
FIG. 1 is a perspective view of a tamper proof container/lid assembly in accordance with an exemplary embodiment of the invention.
Figure 2:
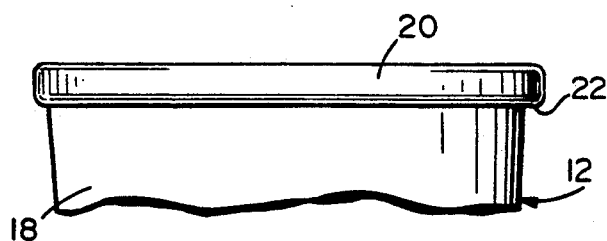
FIG. 2 is a partial side view of the upper portion of a container body of the type shown in FIG. 1.
Figure 3:
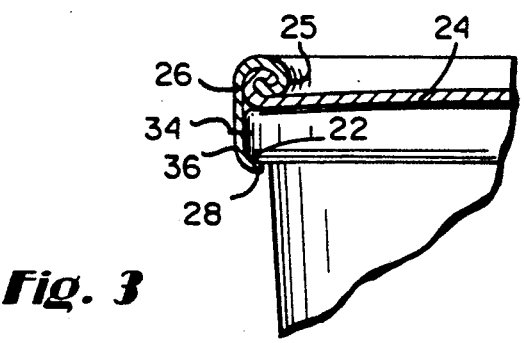
FIG. 3 is a partial sectional view illustrating the connection between the container body and lid.

With reference to FIG. 1, a tamper proof container assembly 10 includes a container body 12 and a lid 14. The container body 12 is formed with a bottom wall 16 and a peripheral side wall 18. At the upper end of the container body, there is a radially outwardly extending flange or rim 20 (see FIGS. 2 and 3), preferably formed by rolling the free edge of the peripheral side wall outwardly onto the container body peripheral side wall and compressing it against the side wall in a conventional manner. The rim 20 has a lower edge 22 which extends about the entire periphery of the container body.

The lid 14 includes a top wall 24 and a depending skirt 26. In a preferred arrangement, top wall 24 and depending skirt 26 are separate components which may be roll seamed to each other about a line 25. The depending skirt 26 is preferably of spiral wound construction, i.e., formed by a slicing a spiral tube made of conventional spiral wound lid stock.

Located toward the lower free edge 28 of the skirt 26, there is an annular line of perforations 30 which extends about the entire circumference of the skirt, to thereby separate the skirt 26 into upper and lower portions.

Prior to filling, the depending skirt 26 extends downwardly relative to the top wall 24 at substantially right angles thereto. Thus, the lower free edge 28 of the depending skirt does not interfere with the assembly of the lid to the container. Upon filling of the container body with contents, substantially the entire free edge 28 of the depending skirt 26 is mechanically curled or rolled under the lower edge 22 of the rim or flange 20 to a position best seen in FIG. 3. This arrangement insures secure locking of the lid to the container body. However, it is advantageous to leave a small portion of the free edge untucked to thereby provide a gripping tab or area 32 for a purpose explained below.

With reference again to FIG. 1, the annular line of weakening 30 is preferably (but not necessarily) formed by a plurality of circumferentially spaced perforations 34 which thereby define a tear strip 36 having a width extending from the perforations 34 to the free edge 28 of the depending skirt, and a length corresponding to the circumference of the skirt 26. Other means may be employed to facilitate removal of the tear strip 36, such as a weakened score line or the like.

To open the container initially after purchase, the gripping area 32 is pulled upwardly at a slit or perforation 38, thereby causing a vertical tear to the perforation line 30. Continued pulling of the tab in the direction indicated by arrow A will result in peripheral tearing about the perforation line 30 (indicated in phantom in FIG. 1), resulting in complete separation and removal of the strip 36 from the lid 14. It will be understood that other means may be provided to facilitate removal of the tear strip. For example, an integral or separate pull tab could be provided on the tear strip, with the lower edge 28 tucked about the entire circumference of the lid. When using spiral wound lid stock, it is important that the tear strip be torn in a direction which does not intersect a downwardly extending portion of a spiral seam. By locating the slit or perforation 38 to one side of the gripping area, the user will naturally tend to grip the larger portion to one side of the slit or perforation and continue to pull the strip 36 away from the slit in the desired direction, so as not to destroy the remaining upper portion of the skirt. Printed or graphic instructions may also be utilized to insure proper manipulation.

It will be readily appreciated from the above description that any tampering with the container on the shelf or prior to consumer use will be readily ascertained merely by visual inspection.

It will also be appreciated from the drawing figures, that even after the tear strip 36 has been torn away from the container lid 14, there is sufficient length to the depending skirt 26 to enable effective and repeated use of the lid 14 with the container body 12.

It is also a feature of this invention to provide a novel method of filling and sealing a container assembly of the type described above which comprises the steps of a) filling the container body 12 with contents;
b) applying the lid 14 to the container body; and
c) tucking a substantial portion of the lower free edge 28 of the lid skirt 26 under the edge 22 of container rim 20, while leaving a minor portion untucked so as to provide a gripping area 32 to facilitate removal of the tear strip 36 from the skirt 26.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tamper evident container assembly comprising:
an open-ended container body having a bottom wall and peripheral side wall, said side wall having an upper rim protruding radially outwardly of said peripheral side wall;
a reusable lid having a top wall portion constructed of skirt portion, said depending skirt portion constructed of spiral wound stock and having a free end, a major portion of said free end tucked under said upper rim, said skirt portion including the tucked portion being in substantially continuous engagement with said rim to thereby lock said lid to said container body;
wherein said depending skirt portion is further provided in a lower portion thereof with a line of weakening extending annularly about said skirt portion to thereby define an annular removable tear strip inclusive of said free end; and further wherein a minor portion of said free end is left untucked to thereby provide a gripping area to facilitate tearing and removal of said tear strip.

2. The assembly of claim 1 wherein said top wall and said depending skirt of said lid are separate components seamed together about an upper edge of said depending skirt.

3. The assembly of claim 1 wherein said upper rim comprises an outwardly rolled free edge of said peripheral side wall.

4. The assembly of claim 1 wherein said container and said lid are constructed of paper board.

5. A tamper evident container assembly comprising:
an open-ended container body having a bottom wall and a peripheral side wall terminating in an annular, radially outward rim having a lower edge spaced axially below an uppermost edge of said peripheral side wall;
a reusable lid having a top wall and a depending skirt having upper and lower portions, said depending skirt formed of spiral wound paper stock and incorporating first means in said lower portion of said depending skirt engaging said rim when said lid is in place on the container body for locking said lid to said container body, and second means for separating said upper and lower portions so as to allow removal of said lid from said container body without destroying said upper portion of said depending skirt, said second means comprising a substantially horizontal, annular line of weakening in said spiral wound stock between said upper and lower portions of said depending skirt, and an integral gripping tab in said lower portion; wherein said first means is in substantially continuous engagement with said rim except in an area defined by said gripping tab.

6. The assembly of claim 5 wherein said first means includes a lowermost free edge which is tucked under said lower edge of said rim.

7. The assembly of claim 5 wherein said annular line of weakening comprises a plurality of circumferentially spaced perforations.

8. A method of assembling a tamper proof container assembly including a container body having a bottom wall and a peripheral side wall including a radially outwardly projecting rim at an upper end thereof, and a reusable lid having a top wall and an axially extending depending skirt, said depending skirt constructed of spiral wound stock and having a line of weakening formed therein extending annularly around said skirt intermediate an upper end and a lower free edge thereof to thereby define a removable tear strip which, when removed, permits said lid to be removed from said container body; the method comprising the steps of:
a) filling said container body with contents;
b) applying said lid to said container body;
c) tucking a major portion of said lower free edge under said rim so that said portion of said free edge engages said rim; and
d) leaving a minor portion of said lower free edge untucked to provide a gripping area facilitating tearing and removal of said tear strip.

* * * * *

UNITED STATES PATENT AND TRADEMARK OFFICE
CERTIFICATE OF CORRECTION

PATENT NO. : 5,253,772
DATED : October 19, 1993
INVENTOR(S) : EARNEST

It is certified that error appears in the above-indentified patent and that said Letters Patent is hereby corrected as shown below:

Column 5:
Claim 1, line 6, delete "constructed" and insert therefor --and a depending--; and
line 7, delete "of".

Signed and Sealed this

Twelfth Day of July, 1994

Attest:

BRUCE LEHMAN

*Attesting Officer*   *Commissioner of Patents and Trademarks*

REEXAMINATION CERTIFICATE (2680th)
United States Patent [19]
Earnest

[11] B1 5,253,772

[45] Certificate Issued Sep. 19, 1995

[54] TAMPER EVIDENT CONTAINER ASSEMBLY

[75] Inventor: Edward M. Earnest, Owings Mills, Md.

[73] Assignee: Sweetheart Cup Company Inc., Chicago, Ill.

Reexamination Request:
No. 90/003,593, Oct. 7, 1994

Reexamination Certificate for:
Patent No.: 5,253,772
Issued: Oct. 19, 1993
Appl. No.: 26,202
Filed: Feb. 26, 1993

Certificate of Correction issued Jul. 12, 1994.

Related U.S. Application Data

[63] Continuation of Ser. No. 876,907, Apr. 30, 1992, abandoned, which is a continuation of Ser. No. 703,858, May 21, 1991, abandoned.

[51] Int. Cl.[6] .............................................. B65D 17/40
[52] U.S. Cl. .................................. 220/276; 220/270; 229/123.2; 53/488
[58] Field of Search ................. 220/270, 276; 215/256, 215/305; 229/123.2, 201; 156/69; 53/412, 471, 488

[56] References Cited
U.S. PATENT DOCUMENTS

| | | |
|---|---|---|
| 2,002,564 | 5/1935 | Bergman . |
| 2,073,537 | 3/1937 | Bombard . |
| 3,208,626 | 9/1965 | Miller et al. . |
| 3,425,592 | 2/1969 | Vogel . |

*Primary Examiner*—Allan N. Shoap

[57] ABSTRACT

A tamper evident container assembly includes an open-ended container body having a bottom wall and peripheral side wall, the side wall having an upper rim protruding radially outwardly of the peripheral side wall. A reusable lid has a top wall and a portion of which is tucked under the upper rim to thereby lock the lid to the container body. The depending skirt is further provided in a lower portion thereof with an annular line of weakening extending about the skirt portion to thereby define an annular tear strip inclusive of the free end so that upon removal of the tear strip, the lid may be removed from said container. A related method of assembling a tamper evident container assembly the steps of:
a) filling the container body withy contents;
b) applying the lid to the container body; and
c) trucking a substantial portion of the lower free edge under the rim to thereby provide a tamper evident container.

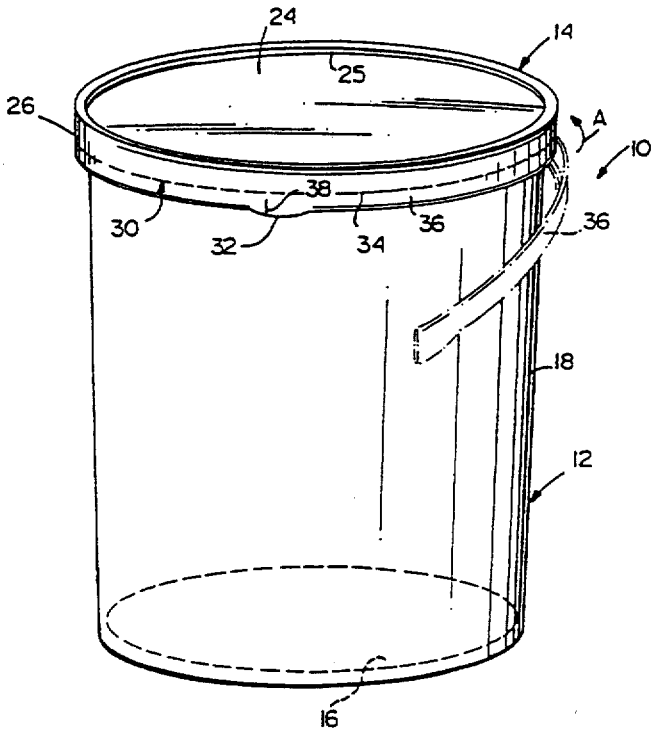

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *